(12) United States Patent
Llamas Sandin et al.

(10) Patent No.: US 8,038,093 B2
(45) Date of Patent: Oct. 18, 2011

(54) AIRCRAFT CONTROL DEVICE

(75) Inventors: Raul Carlos Llamas Sandin, Madrid (ES); Alfonso Gonzalez Gozalbo, Madrid (ES); Jorge Pablo Verde Preckler, Madrid (ES); José Alberto Cabello Moreno, Madrid (ES); José Luis Collado Briceño, Madrid (ES)

(73) Assignee: Airbus Espana, S.L., Madrid (ES)

( * ) Notice: Subject to any disclaimer, the term of this patent is extended or adjusted under 35 U.S.C. 154(b) by 839 days.

(21) Appl. No.: 12/070,910

(22) Filed: Feb. 21, 2008

(65) Prior Publication Data
US 2009/0159755 A1      Jun. 25, 2009

(30) Foreign Application Priority Data

Dec. 21, 2007   (ES) .................................. 200703402

(51) Int. Cl.
*B64C 13/42*         (2006.01)
(52) U.S. Cl. ........................ 244/87; 244/91; 244/99.4
(58) Field of Classification Search ................ 244/87, 244/91, 99.2–99.4, 123.9, 215
See application file for complete search history.

(56) References Cited

U.S. PATENT DOCUMENTS

| | | | | | |
|---|---|---|---|---|---|
| 2,511,504 | A | * | 6/1950 | Hawkins ......................... | 244/208 |
| 2,595,363 | A | * | 5/1952 | Lee ................................. | 244/87 |
| 3,706,432 | A | * | 12/1972 | Accashian ..................... | 244/226 |
| 4,213,587 | A | * | 7/1980 | Roeseler et al. .............. | 244/213 |
| 4,542,866 | A | * | 9/1985 | Caldwell et al. ............. | 244/45 A |
| 5,884,872 | A | * | 3/1999 | Greenhalgh .................. | 244/201 |
| 6,089,503 | A | * | 7/2000 | Volk ............................... | 244/48 |

* cited by examiner

*Primary Examiner* — Tien Dinh
*Assistant Examiner* — Michael Kreiner
(74) *Attorney, Agent, or Firm* — Ladas & Parry LLP

(57) ABSTRACT

The invention relates to a control surface (3) for an aerodynamic lifting surface (2) of aircraft comprising a main closing rib (9) located at one end of the control surface (3) to which a main torsion bar (8) is joined, the mentioned torsion bar (8) being joined at its other end to a lever system (14) on which at least one actuator (15) acts, such that it is possible to act on the rotation of the mentioned control surface (3) during the flight of the aircraft. The invention also relates to an actuation method for actuating such a control surface (3).

14 Claims, 4 Drawing Sheets

AIRCRAFT CONTROL DEVICE

FIELD OF THE INVENTION

The present invention relates to the optimized configuration of an aircraft flight control surface.

BACKGROUND OF THE INVENTION

The most widely used configuration for modern aircraft control surfaces generally consists of one or several essentially planar elements located such that they form the leading edge or trailing edge of the aerodynamic lifting surfaces of the aircraft. The aircraft is controlled by means of the deflection of the control surfaces, which causes a change in the outer geometry of said aircraft resulting in aerodynamic direction and magnitude forces suitable for carrying out the control.

The change of aerodynamic shape required to control the aircraft is generally achieved by means of the rotation of said control surfaces around a hinge or rotating shaft fixed with respect to the aerodynamic lifting surface to which they belong. There are other configurations and methods to carry out the control, for example by means of the elastic deformation of the entire lifting surface, a method used by the Wright brothers in the first airplane as described in document U.S. Pat. No. 821,393; by means of a complete rotation of the lifting surface as described in document U.S. Pat. No. 6,089,503; by means of deformation of the lifting or control surface caused by changes in the properties of the material as described in documents U.S. Pat. No. 6,209,824B1, U.S. Pat. No. 5,662,294; or by means of air blasts or engine exhaust gases, such as in the case of the AV-B Harrier airplane, or the North American X-15.

The configurations of the control surfaces consisting of rotating said surfaces around a hinge have been used in aeronautics in most airplanes and are the only ones currently used for large passenger transport airplanes. The first airplanes to use this control surface configuration, as well as most lightweight airplanes today, use a cable and pulley system to transmit the pilot's control actions, either directly using the force exerted by the pilot or through a servo system mechanically amplifying the pilot's force. The cable and pulley systems move the control surfaces through a lever system converting the linear movements of the cables into rotations of the control surfaces. This actuation method for actuating control surfaces is suitable for lightweight aircraft or those of a larger size flying at relatively low speeds (much less than the speeds near the speed of sound at which commercial aircraft currently fly), due to the fact that the forces which the cables can transmit are relatively low and the aerodynamic forces acting on the control surfaces, and which must compensate the forces of the cables, linearly grow with the area of said control surface and with the square of the flight speed. The cable and pulley system has additional limitations due to the inherent flexibility of the system, formed by long cables with a small section, which can lead to aeroelastic instabilities if it is applied to large control surfaces, in addition to introducing a delay in the operation of the control surfaces and a possible lack of response from the flight controls when the plan flies at high speeds, all this due to the lengthening of the cable system introduced by the aerodynamic loads.

With the development of aeronautic technology it was necessary to develop new actuation methods for actuating the flight control surfaces particularly adapted to large airplanes flying at increasingly greater speeds, generally driven by reaction engines. The adopted solution consisted of using servo-actuators, necessary for exerting the high control forces required in order to move large control surfaces at high flight speeds and to place the mentioned actuators in a position such that they could transmit the control forces directly to the control surfaces, representative of a rudder, or to a typical aileron or elevator installation.

The configuration of the previous typical aileron or elevator installation has the evident drawback of requiring an aerodynamic fairing for the actuator, which is an unwanted source of aerodynamic drag. On the other hand, this configuration has the advantage that the leading edge of the control surface is very close to the rear stringer of the lifting surface to which it is associated (generally the wing or the stabilizers) therefore allowing the maximum sectional area of the respective torsion boxes to be used, which results in an increase in the rigidity of said boxes, particularly the torsional rigidity and furthermore, where applicable, the maximum volume of the fuel tank in the case of a wing or horizontal stabilizer.

The configuration representative of a rudder, typical for a modern commercial airplane rudder, does not require an aerodynamic fairing for the actuator, but however has the drawback of significantly reducing the available space between the torsion box of the lifting surface and the control surface. In all cases this involves an unwanted reduction of the torsional rigidity of both elements (main torsion box and aerodynamic control surface). The separation between the rear stringer of the torsion box and the leading edge of the control surface likewise requires installing relatively large and flexible aerodynamic fairings which do not contribute to the rigidity or resistance of the lifting surface, in addition to introducing large bending loads on the ribs of the torsion box at the base of the hinge fittings, all of which is undesirable.

Reducing the area of the section of the torsion box of the lifting surface, imposed by the previously described and necessary separation in order to install the actuator, usually results in a weight increase of the structure since thicker skins and stringers are required in order to restore the desired torsional rigidity for aerodynamic and aeroelastic considerations.

The problem of elastic deformation of the mentioned surfaces under aerodynamic load has to be solved in all flight control systems based on the rotation of the control surfaces. In cable and pulley systems, in which the levers to which the control cables are connected are usually at one end of the control surfaces, the aerodynamic loads cause torsional deformation on the control surface tending to take away control effectiveness. In order to restore control surface effectiveness, the surface's torsional rigidity must be increased, either by increasing the thickness of its structural skins (which adds weight and increases the inertia of the control surface, both unwanted consequences, i.e. weight for aircraft efficiency reasons and inertia for tending to reduce the speed at which dynamic aeroelastic instability or fluttering occurs), or by using a torsion bar near the leading edge of the control surface, which also adds weight but limits the increase of the moment of inertia of the surface.

In the case of systems in which the actuators are connected directly to the control surfaces, said actuators are usually located approximately in the middle of the span of the control surface in order to minimize torsional deformation, or several actuators are used in parallel, which also provides the control system with redundancy. In any case, the placement of the actuators within the aerodynamic surface requires providing accesses thereto for inspection, which complicates the design of said aerodynamic surfaces, and in the case of the rudders makes access difficult for maintenance personnel.

The object of the present invention is to solve the previously mentioned problems with regard to making control surfaces, particularly those associated to the configuration in which the actuators are directly connected to said control surfaces, since this is the configuration used for control surfaces in stabilizers in large modern commercial airplanes.

SUMMARY OF THE INVENTION

The present invention thus relates to a control surface configuration for aircraft in which said control surface is integral with a torsion bar rotating with respect to its shaft by means of the action of actuators installed inside the fuselage of the aircraft in question.

The present invention describes a configuration and actuation method which can be applied to the control surfaces of an aircraft, whether they are rudders, elevators, ailerons, flaps or air brakes, consisting of actuating the rotation of the mentioned surfaces by means of a torsion bar concentric with the hinge pin of the control surface, the mentioned torsion bar being connected by means of a lever inside the fuselage of the aircraft to one or several conventional actuators (hydraulic, electrohydraulic, electric or any other type used in aeronautics), these being double-acting actuators, i.e. being able to exert force in both directions of their shaft.

Due to the distribution of aerodynamic forces on the control surface and the resulting torsional deformation, the configuration object of the present invention is particularly adapted to very narrow control surfaces, such that the area enclosed by sections of the control surface that are perpendicular to the hinge pin reduces significantly from the end where the torsion bar acts to the free end. The main advantage of the configuration of the invention in relation to classic configurations is that it allows drawing the leading edge of the control surface closer to the rear stringer of the torsion box of the aerodynamic surface, which reduces the size and the bending loads on the hinge fittings, allows increasing the enclosed area of the torsion box of the lifting surface or of the control surface, or both at the same time, with a torsional rigidity increase directly proportional to said enclosed area, all these advantages being obtained without the aerodynamic penalty caused by a fairing for the actuator. This all allows increasing the length of the lever arm on which the servoactuators act without the geometrical restriction imposed by the aerodynamic profile, therefore reducing the forces required for actuation, which can result in a weight reduction for the actuators.

The configuration according to the present invention likewise allows, for a torsion box of the same size and planform of the lifting surface, having a larger aerodynamic control surface with the possible associated control efficiency increase.

The configuration of the invention additionally allows using larger actuators, if necessary, since the space limitation imposed by the geometry of the aerodynamic surface is for the most part eliminated. Furthermore, in the case of application to the rudders, the position of the actuators within the rear fuselage facilitates maintenance operations.

There are additional advantages associated to the favorable geometry of the leading edge of the control surface in its deflected configuration due to the larger radius of said leading edge, which is possible to obtain upon moving the hinge pin forward, which can increase the aerodynamic stalling angle that the control surface can reach.

The configuration object of the present invention is also particularly favorable for including a second hinge pin located at an intermediate point of the control surface, which gives rise to the double hinge configuration in the control surface.

Other features and advantages of the present invention will be inferred from the following detailed description of an illustrative embodiment of its object in relation to the attached figures.

DETAILED DESCRIPTION OF THE INVENTION

It is understood from the description made in the background of the invention and from the known prior art that it is generally desirable for torsion boxes of lifting and control surfaces to have the largest area possible in order to increase their rigidity and reduce their structural weight. The configuration shown in FIG. 3, in which the actuator 4 is located outside the aerodynamic surface 2, has these qualities but at the expense of an increase in aerodynamic drag due to the fairing 17 of the actuator 4. Some flight control system configurations using cables and pulleys include a torsion bar on the control surface with a lever to which the control cables are connected, the mentioned lever being located inside the fuselage, such that the need of an aerodynamic fairing is eliminated. This configuration can be observed in most rudders in lightweight airplanes today. Nevertheless, as has been previously explained, the use of control systems based on cables and pulleys is limited to lightweight aircraft or generally to aircraft flying at relatively low speeds.

Figure 1:
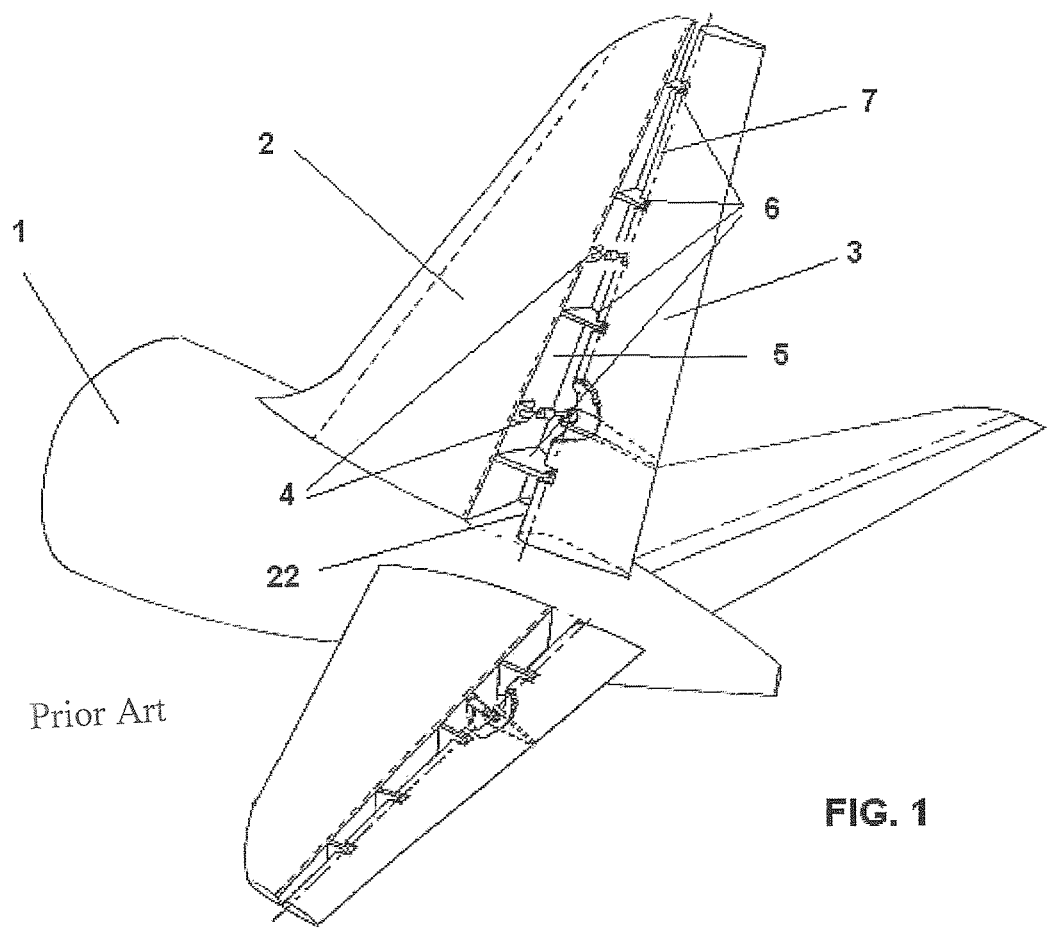
FIG. 1 depicts a schematic view of the rear fuselage and the stabilizers and rudders of a modern commercial airplane, in which the arrangement of the actuators and the hinge fittings are schematically shown according to the previously known prior art.
Figure 2:
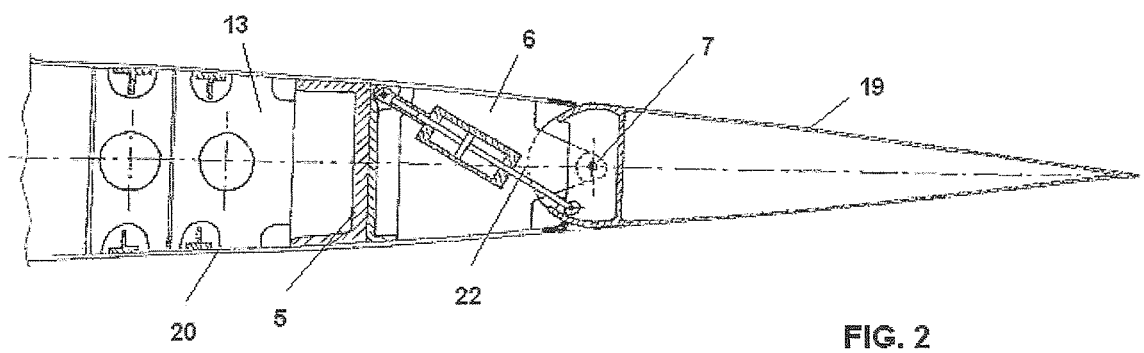
FIG. 2 shows a detailed sectional view of the vertical stabilizer depicted in FIG. 1, in which the actuator of the control surface and the manner in which said actuator is joined to the torsion box and to the mentioned control surface, in this case a rudder, is schematically depicted according to the known prior art.

Flight control systems using servoactuators 4 located within the aerodynamic contour of the lifting surface 2 and which are connected directly to the control surfaces 3, such as in the example of FIGS. 1 and 2, require sufficient space between the rear stringer 5 of the torsion box 13 of the lifting surface 2 and the leading edge 22 of the control surface 3 in order to be able to install said servoactuators 4, with the subsequent unwanted reduction of the area of the torsion box 13 of the lifting surface 2. It must be noted that in large commercial airplanes using this configuration of actuators there are usually two or more actuators, generally connected to different hydraulic circuits, for each control surface, for the purpose of providing the control system with redundancy in the event that one of the actuators or its hydraulic circuit fails, this failure tolerance being an essential requirement in the design of modern flight control systems.

Figure 3:
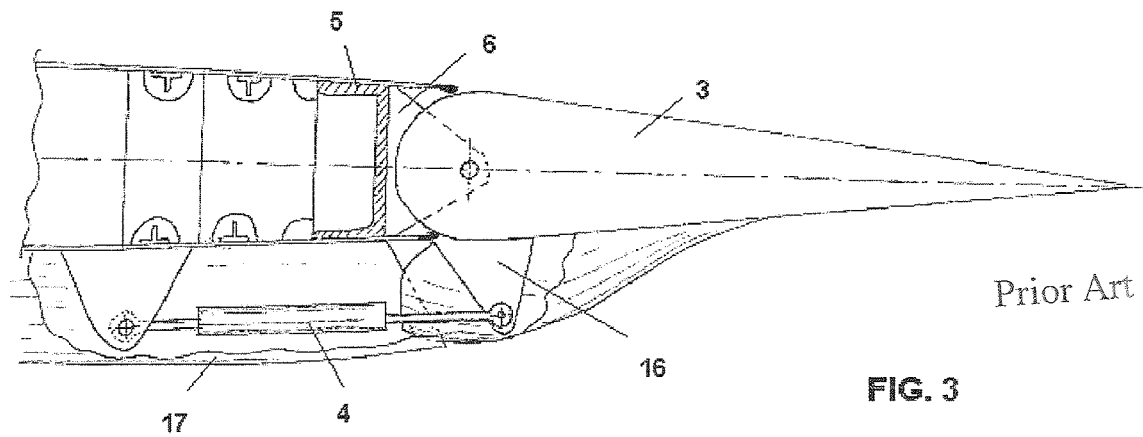
FIG. 3 shows a detailed sectional view of a lifting surface, typically a wing, and of an associated control surface, in this case actuated from outside the aerodynamic surface according to the known prior art.

The present invention has been developed for the purpose of obtaining a configuration of control surfaces with maximum torsional rigidity of the lifting surface, which is desirable in order to reduce the structural weight thereof, but without the aerodynamic drag penalty associated to the fairing 17 of FIG. 3 and maintaining the redundancy in the control system at least at the same level as in the control systems with several actuators currently in use, such as those shown in FIG. 1.

Figure 4:
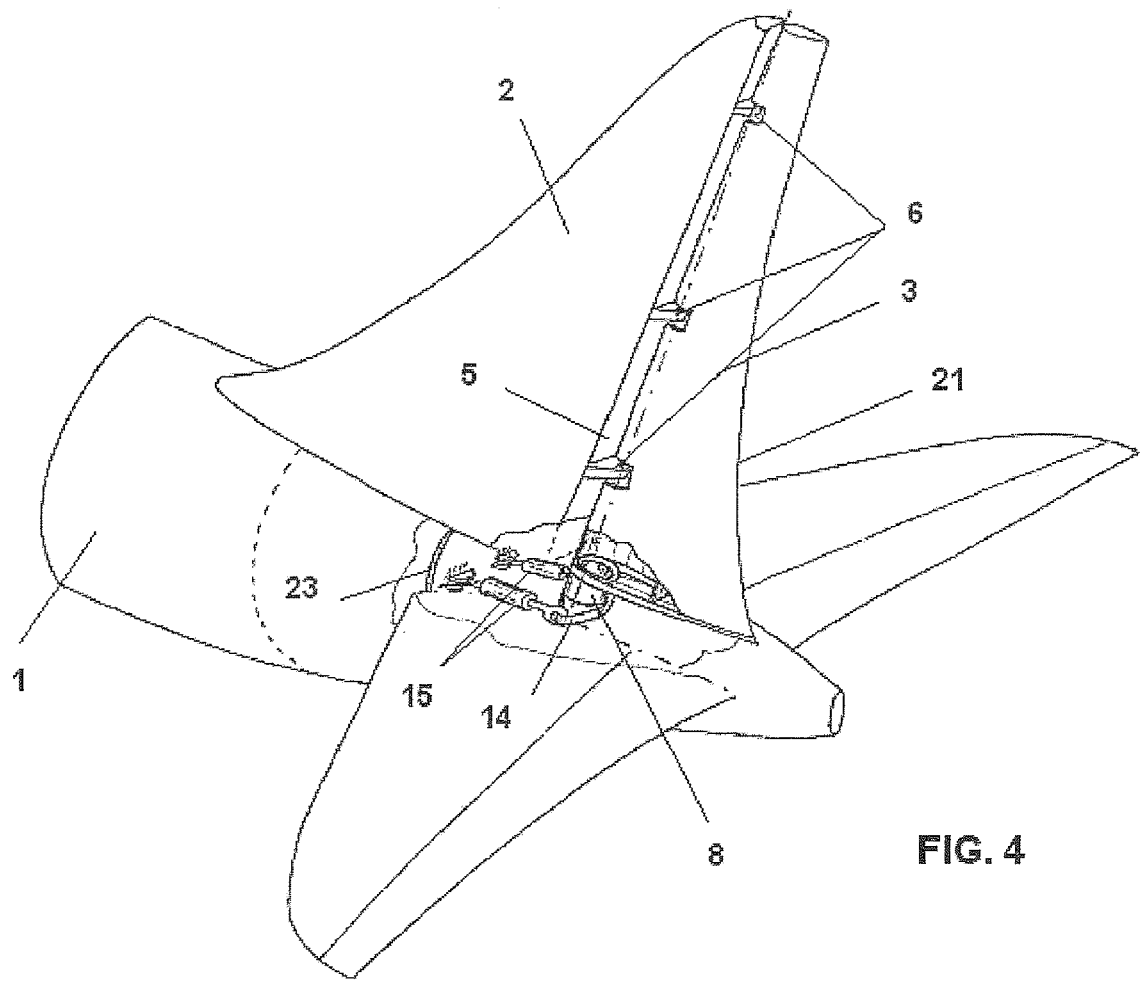
FIG. 4 depicts a schematic view of the rear fuselage and of the stabilizers and rudders of a modern commercial airplane, in which the arrangement of the actuators, the hinge fittings and the torsion bar of the control surface, as well as the considerable narrowing shape of the control surface are schematically shown according to a preferred embodiment of the present invention.
Figure 5:
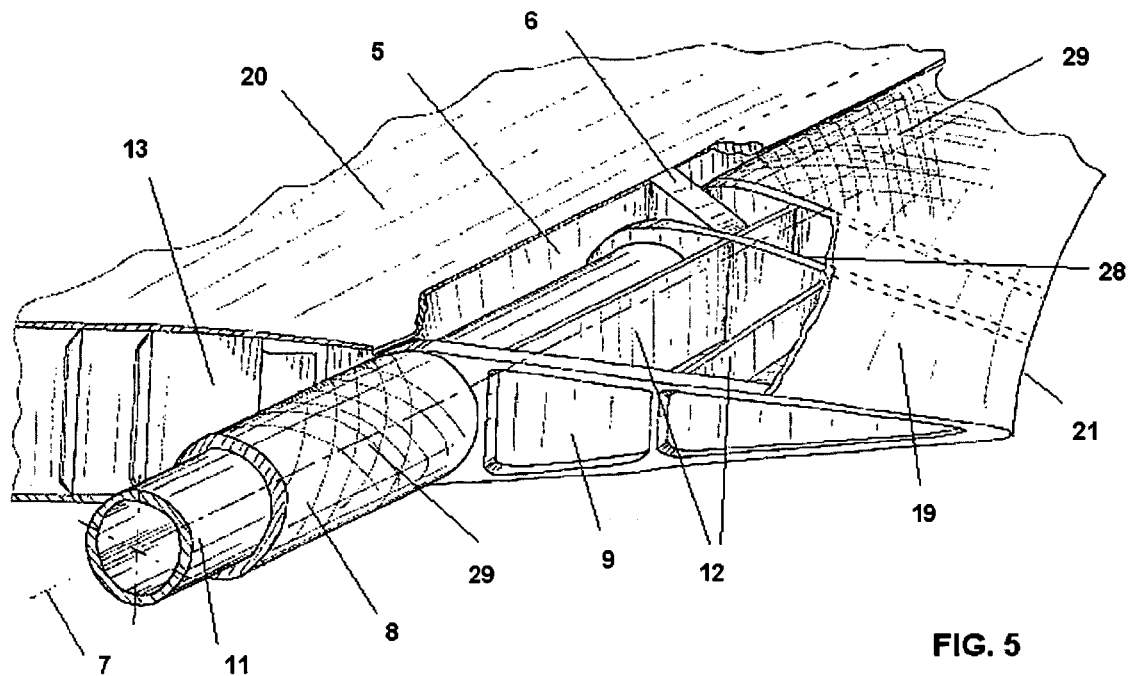
FIG. 5 shows a detailed view of the vertical stabilizer depicted in FIG. 4 focusing on the detail of the end of the control surface to which the torsion bar is connected, in which the two concentric torsion bars, the closing rib to which the outer torsion bar is joined and the secondary torsion box of the control surface, as well as one of the hinge fittings are depicted according to a preferred embodiment of the present invention.
Figure 6:
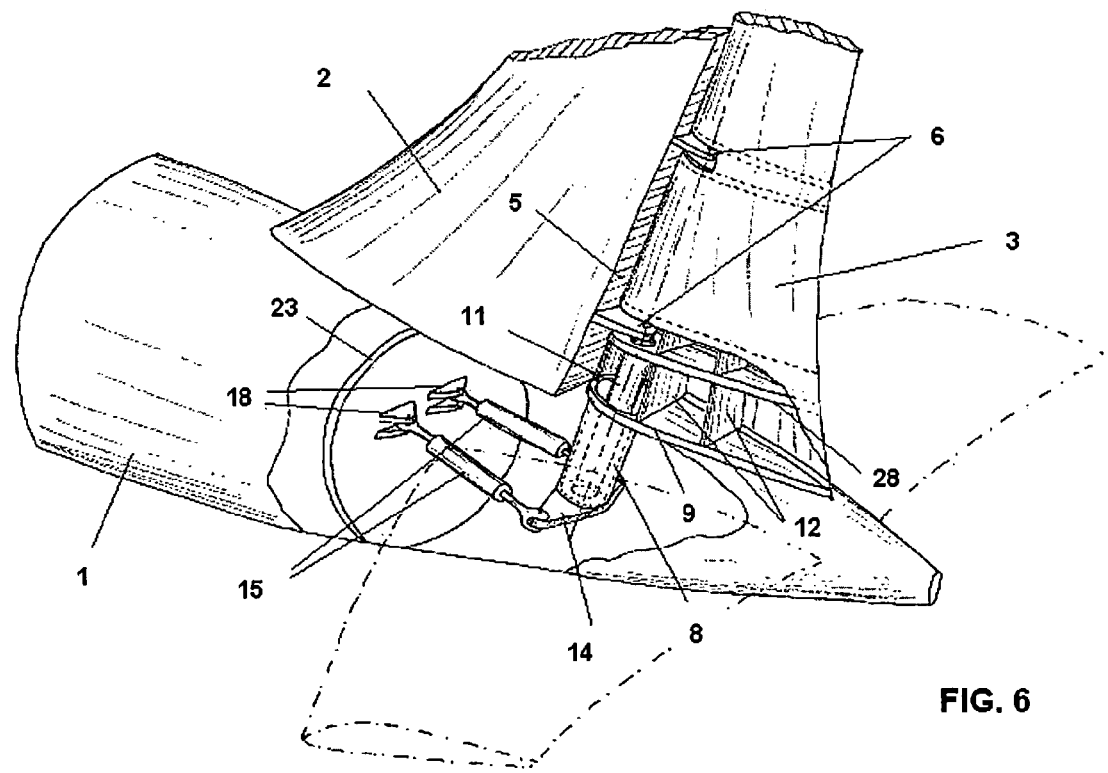
FIG. 6 depicts a detailed schematic view of the rear fuselage and of the stabilizers and rudders of a modern commercial airplane, in which the arrangement of the actuators and the levers on which they act, the hinge fittings, the primary and secondary torsion bars, the secondary torsion box of the control surface, the lower closing rib of the control surface, as well as the intermediate reinforcing ribs of the control surface, as well as the considerable narrowing shape of the control surface are schematically shown according to a preferred embodiment of the present invention.

The features of the present invention will be better understood upon describing a preferred embodiment of a rudder of a modern commercial airplane as depicted in FIGS. 4, 5 and 6.

For this purpose the control surface of the present invention comprises:

an aerodynamic lifting surface 2 to which a control surface 3 is associated;

a main closing rib 9 located at one end of the control surface 3 to which a main torsion bar 8 is joined, the mentioned bar 8 being integrally joined at its other end to a lever system 14 on which at least two double-acting servoactuators 15 supplied by independent power systems act, said servoactuators 15 working simultaneously in normal conditions, such that in the event that one of them or the power system supplying it fails, the operating servoactuator has enough power to actuate the control surface on its own, thus providing the present configuration with redundancy in the actuation system.

In order to increase the redundancy and tolerance to structural damage, the control system comprises a secondary torsion bar 11, concentric with the main bar 8, located inside the latter and likewise integrally connected with the lever system 14 and with a secondary closing rib 28 of the control surface 3. In normal conditions the torsional moment required in order to move the control surface 3 is transmitted by the main torsion bar 8 to the main closing rib 9. In the event that said main torsion bar 8 or main closing rib 9 fails, the torsional moment is transmitted by the secondary torsion bar 11 to the secondary closing rib 28, thus providing the control system with an additional degree of tolerance to structural failure.

The control surface 3 is rigidized internally by at least two stringers 12 which, together with the skin 19, form a continuous torsion box providing the control surface 3 with the torsional rigidity required for aerodynamic and aeroelastic considerations.

The skins 19 and stringers 12 of the control surface, as well as the main torsion bar 8 and secondary torsion bar 11, are preferably manufactured from a material made up of highly rigid and strong fibers, such as carbon fiber or nanotechnological materials, such as carbon nanotubes, and synthetic resin, epoxy for example, and a large portion of said fibers are oriented in directions close to 45 and 135 degrees with respect to the hinge pin as shown in detail 29 of FIG. 5.

The control surface 3 is joined to the rear stringer 5 of the torsion box 13 of the lifting surface 2 through several hinge fittings 6 joined to removable pins on the control surface, this method being known and generally applied in control surfaces.

The shape of the control surface 3 is preferably as shown in FIG. 4, in which it can be observed that the trailing edge 21 of said control surface is curved and the control surface becomes significantly narrower upon getting further away from the fuselage 1, unlike the common practice depicted in FIG. 1, which, in addition to other possible aerodynamic advantages or flight qualities, results in a distribution of aerodynamic forces the resultant of which is closer to the fuselage 1 and therefore to the torsion bar and the actuation levers 14, this being beneficial for the purpose of rigidity and of load transmission. Furthermore, the geometry shown in FIG. 4, both of the lifting surface 2 and of the control surface 3, presents problems for installing the actuators in a classic configuration such as that of FIG. 1, due to the required space between the rear stringer of the lifting surface 5 and the leading edge of the control surface 22.

Figure 7:
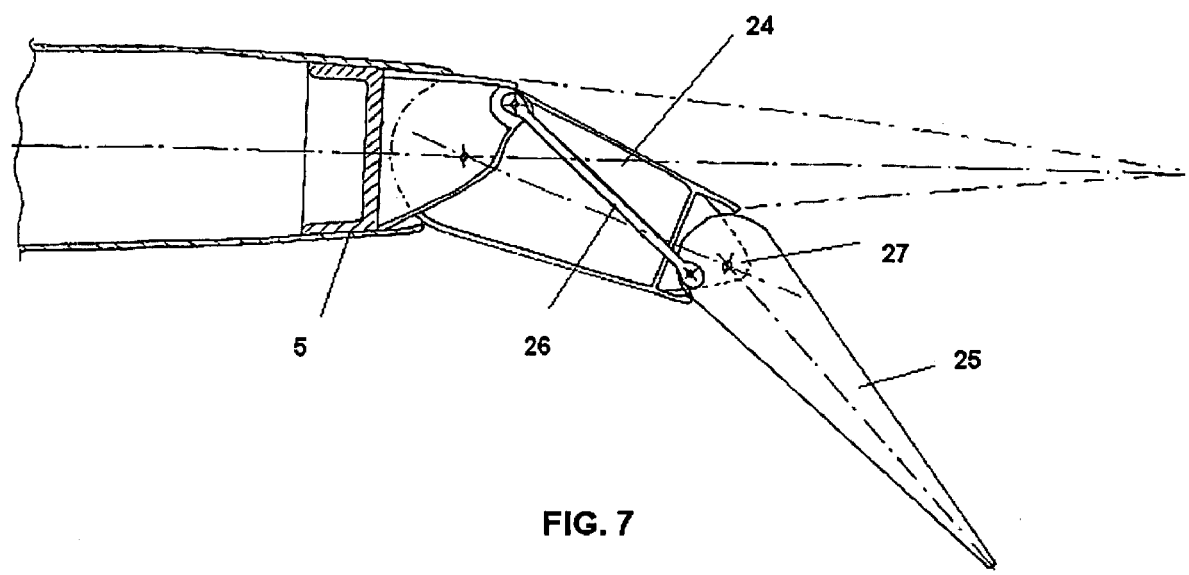
FIG. 7 shows a detailed sectional view of the vertical stabilizer depicted in FIG. 4 but with the double hinge configuration of the control surface, at the height of an intermediate point in its span, in which a hinge fitting, the primary element of the control surface, a coupling bar for mechanically coupling with the secondary element, said secondary element and the secondary hinge fitting are schematically depicted according to a preferred embodiment of the present invention.

According to another preferred embodiment of the configuration object of the present invention, a secondary hinge pin 27 is added, as shown in FIG. 7, such that the control surface is divided into a primary element 24 and a secondary element 25, the rotation of which is mechanically limited by a coupling bar 26 arranged as indicated in FIG. 7. The present invention is particularly favorable for implementing this double hinge configuration due to the fact that said double hinge configuration causes aerodynamic loads that are larger than those of the classic single hinge configuration, therefore requiring larger actuators, the installation of which within the fuselage, as proposed by the present invention, is less problematic than in the classic case of FIG. 1.

According to another aspect, the present invention relates to an actuation method for actuating the previously described control surface 3 in which said control surface 3 is actuated through at least one torsion bar 8 to which at least two double-acting servoactuators 15 are connected by means of a lever system 14.

The modifications comprised within the scope defined by the following claims can be introduced in the preferred embodiments which have just been described.

The invention claimed is:

1. A control mechanism for a control surface (3) for an aerodynamic lifting surface (2) of aircraft, characterized in that said mechanism comprises a main closing rib (9) located at one end of the control surface (3) having joined thereto a main torsion bar (8) located at the edge of said control surface and defining an axis about which said control surface is configured to rotate such that it may move from an orientation coplanar with said aerodynamic lifting surface to one that is not coplanar with said aerodynamic lifting surface main torsion bar (8) being joined at its other end to a lever system (14)

on which at least one actuator (15) acts, whereby rotation of the mentioned control surface (3) during the flight of the aircraft may be effected, wherein said control mechanism further comprises a secondary torsion bar (11), which secondary torsion bar is concentric with the main torsion bar (8), is located inside the main torsion bar (8) and is connected with the lever system (14) and with a secondary closing rib (28) of the control surface (3).

2. A control mechanism for a control surface (3) for an aerodynamic lifting surface (2) of aircraft according to claim 1, characterized in that the at least one actuator (15) is a double acting actuator, being able to exert force in both directions of its shaft.

3. A control mechanism for a control surface (3) for an aerodynamic lifting surface (2) of aircraft according to claim 1, characterized in that the actuator (15) is a servoactuator.

4. A control mechanism for a control surface (3) for an aerodynamic lifting surface (2) of aircraft according to claim 1, characterized in that the at least one actuator is two actuators.

5. A control mechanism for a control surface (3) for an aerodynamic lifting surface (2) of aircraft according to claim 4, characterized in that the actuators (15) work simultaneously in normal conditions, such that in the event of a failure in one of them, the operating actuator can actuate the control surface on its own.

6. The control mechanism of claim 5 wherein said operating actuator is a sevoactuator.

7. A control mechanism for a control surface (3) for an aerodynamic lifting surface (2) of aircraft according to claim 1, characterized in that the main torsion bar (8) is manufactured from material made up of highly rigid and strong fibers.

8. A control mechanism for a control surface (3) for an aerodynamic lifting surface (2) of aircraft according to claim 7, characterized in that the main torsion bar (8) is made of carbon fiber.

9. A control mechanism for a control surface (3) for an aerodynamic lifting surface (2) of aircraft according to claim 1, characterized in that it comprises at least two stringers (12) which internally stiffen the mentioned control surface (3).

10. A control mechanism for a control surface (3) for an aerodynamic lifting surface (2) of aircraft according to claim 1, characterized in that the secondary torsion bar (11) is manufactured from material made up of highly rigid and strong fibers.

11. A control mechanism for a control surface (3) for an aerodynamic lifting surface (2) of aircraft according to claim 10, characterized in that the secondary torsion bar (11) is made of carbon fiber.

12. A control mechanism for a control surface (3) for an aerodynamic lifting surface (2) of aircraft according to claim 1, characterized in that it further comprises a hinge pin (27), such that the mentioned control surface (3) is divided into a primary element (24) and a secondary element (25), which may be rotated to different degrees and wherein rotation of the secondary element is restricted by a coupling bar (26).

13. The control mechanism of claim 1 wherein said control surface is selected from the group consisting of rudders, elevators, ailerons, flaps, or air brakes.

14. A method for actuating a control surface for an aerodynamic lifting surface of an aircraft, the method comprising
providing the control mechanism of claim 1; and
applying a torsional moment to at least one of said main torsion bar and said secondary torsion bar.

* * * * *